United States Patent [19]

Aikens

[11] Patent Number: 4,934,886
[45] Date of Patent: Jun. 19, 1990

[54] FASTENING ASSEMBLY AND METHOD OF FASTENING

[75] Inventor: Wallace R. Aikens, Plano, Tex.

[73] Assignee: Gulton Industries, Inc., Plano, Tex.

[21] Appl. No.: 255,061

[22] Filed: Oct. 7, 1988

[51] Int. Cl.$^5$ .................... F16B 27/00; F16B 37/00
[52] U.S. Cl. .................................. 411/85; 411/104; 411/182; 29/453
[58] Field of Search ................ 411/84, 85, 103, 104, 411/112, 111, 121, 182; 29/453; 81/485, 486

[56] References Cited

U.S. PATENT DOCUMENTS

| | | | |
|---|---|---|---|
| 2,218,823 | 10/1940 | Kengel | 411/112 |
| 3,373,789 | 3/1968 | Parkin et al. | 411/112 |
| 4,119,130 | 10/1978 | Berecz | 411/104 |
| 4,708,554 | 11/1978 | Howard | 411/84 |
| 4,741,582 | 5/1988 | Peroni | 411/85 |

OTHER PUBLICATIONS

Unistrut Catalog of Unistrut Corporation, Wayne, Mich. (1986).

Primary Examiner—Neill R. Wilson
Attorney, Agent, or Firm—Darby & Darby

[57] ABSTRACT

A method of fastening and a fastening assembly are disclosed, where a nut may be retained in a grooved channel by a resilient retainer. The retainer has a central portion with an opening in registry with the threaded opening of the nut and also has two wings extending in opposite directions outward from the central portion. The wings have sharp edges to grip into the channel. A tool with projections is used to disengage the wings from the channel and permit the assembly to be slid along the grooved channel to a desired position. Upon withdrawal of the tool, the sharp edges of the wings resiliently grip into the channel to releasably retain the nut in the channel.

22 Claims, 2 Drawing Sheets

FASTENING ASSEMBLY AND METHOD OF FASTENING

BACKGROUND OF THE INVENTION

The present invention relates generally to a fastening assembly, a retainer for such assembly, and a tool and method for fastening, useful, for example, in adjustably securing a lighting fixture to an extrusion element or channel providing a support.

It is known to position a nut to a desired location in a grooved channel and to then fasten the nut in position. Fastening has been effected in various ways. In U.S. Pat. Nos. 3,483,910 and 4,575,295, fastening is effected by rotating the nut so that a spring biases the nut against inwardly directed flanges of the channel. In U.S. Pat. No. 2,575,594, resilient fingers of a retainer are snapped onto a special carrier for the nut. None of these techniques combine the positioning and fastening steps together.

Pronged tools have been utilized for positioning a spring clip. In U.S. Pat. No. 3,965,776, a pronged tool is used to push a spring clip onto a stud. In U.S. Pat. No. 2,799,082, a pronged tool is used to spread apart legs of the spring clip. The actual spreading is done by a semi-circular projection between the prongs. Once spread apart, the legs are wedged between the semi-circular portion and the prongs and thereby kept open. None of these pronged tools are employed in a grooved channel and they are not used to locate or secure a nut into position.

SUMMARY OF THE INVENTION

It is an object of the present invention to provide an improved fastening assembly, retainer for such an assembly and a tool and method for fastening that facilitate positioning of a fastener (e.g. a nut) in and along a channel.

In keeping with this object, and others which will become apparent below, one aspect of the present invention resides in a retainer having a central portion and a pair of wings disposed at an oblique angle relative to the central portion. The wings have engaging portions and are flexibly bendable relative to the central section between an engaging position in which the engaging portions engage a surface of the channel and a non-engaging position in which the engaging portions are moved out of engagement with the surface of the channel. The central portion has an opening in alignment with a threaded portion of a fastening element such as a nut. The wings may be resiliently urged into the engaging position.

Another aspect of the present invention resides in a combination of a fastening element such as a nut, a retainer, and a grooved channel in which the fastening element is releasably retained by the retainer.

Still another aspect of the present invention resides in sliding the retainer with a fastening element to a desired location in a grooved channel by disengaging the wings from the channel and thereafter allowing the wings of the retainer to resiliently engage their edges into the channel so that the fastening element is releasably held by the retainer at the desired location in the channel. The edges of the wings are releasable from the channel by bending the wings back to move the edges out of engagement with the channel.

It is another object of the present invention to provide a tool for releasing the wings of such an assembly in one easy movement. The tool may be inserted into the grooved channel so that a depressed area between two projections of the tool accommodates the fastening element therein. The projections of the tool are formed to spread the two wings apart to disengage them from the channel so that the slidable element may be slidably adjusted freely in the grooved channel. Upon withdrawal of the tool, the wings resiliently grip the grooved channel again to secure the slidable element into position in the channel.

It is another object to enable the fastening element to float between the wings and yet still be able to insert a screw or bolt through openings formed in the fastening element and the central portion of the retainer.

For a better understanding of the present invention, reference is made to the following description and accompanying drawings, while the scope of the invention is set forth in the appended claims.

DETAILED DESCRIPTION OF THE PREFERRED EMBODIMENTS

Figure 1:
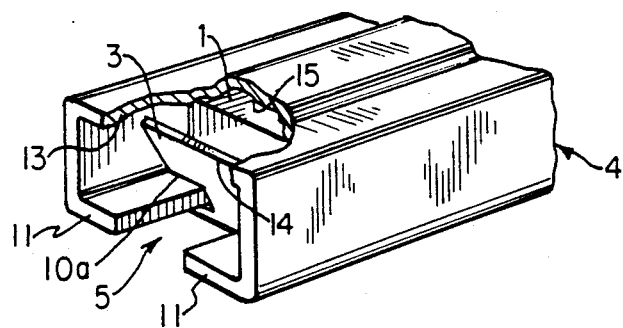
FIG. 1 is a partially broken away perspective view of a fastening assembly in accordance with one embodiment of the present invention.
Figure 2:
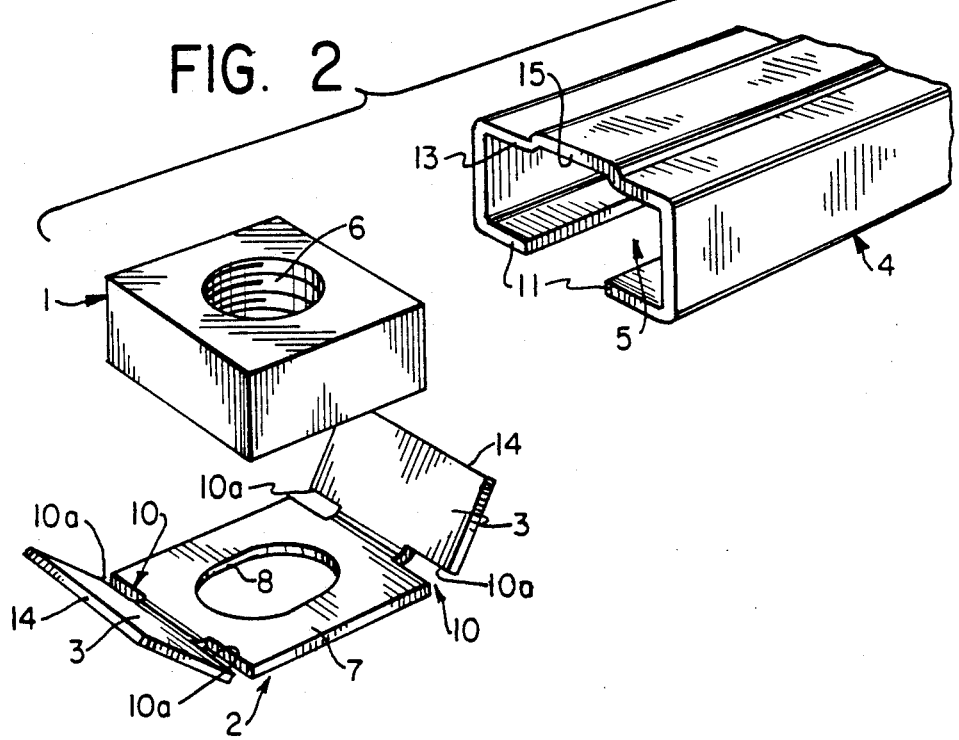
FIG. 2 is an exploded perspective view of the one embodiment of FIG. 1.

FIG. 1 shows a nut fastener arrangement, which includes a conventional nut 1, a retainer 2 with wings 3 for use in a channel 4 with an elongated slot or groove 5. The nut 1 has a customary threaded opening 6 for cooperation with a screw or bolt, not shown. The retainer 2 has a central portion 7 between the wings 3 with an oval opening 8.

Figure 3:
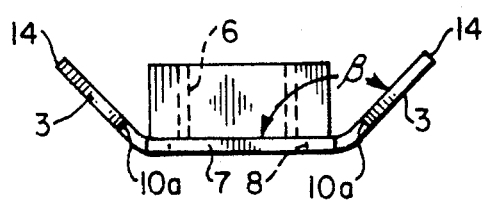
FIG. 3 is a side elevational view of a nut and retainer of the embodiment of FIGS. 1 and 2 prior to insertion.

The nut 1 is placed onto the retainer 2 as shown in FIG. 3, to form a slidable assembly 9, which is slidably inserted into the channel 4, with the wings 3 extending in opposite directions from the central portion 7 in the direction of the length of the groove 5.

The wings 3 have openings 10, in which the inwardly turned edges or flanges 11 of the grooved channel 4 may be slidably engaged. Once the slidable assembly 9 is slid to a desired location, the wings 3 may be pressed upward in the direction of arrows A so that their outer edges 14 press against the inner surface of the upper wall 13 of the channel 4.

Figure 4:
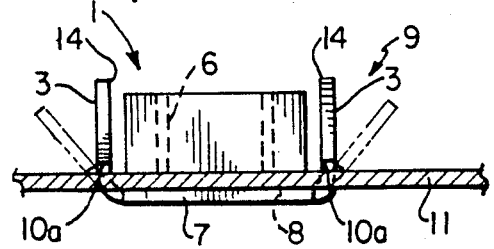
FIG. 4 is a side elevational view of FIG. 3 after insertion.

The retainer 2 is made of resilient material and formed so that in a relaxed position of the wings 3 (at about an angle of 135° or more from the central portion 7) as shown in FIG. 3, the height of opening 10 is less than the thickness of the channel edges 11. However, when the wings 3 are forced upwardly to be nearly perpendicular to the central portion 7, as shown in FIG. 4, openings 10 have greater height than the edge 11 thickness. Thus, if wings 3 are forced upwardly by a suitable tool, the fastener assembly 9 may be freely moved along channel 4 to a desired position. Once the tool is withdrawn, the wings resiliently return to their relaxed position (or to an intermediate locking position such as the position shown by phantom lines in FIG. 4) and clamp the central portion 7 against the undersides of the channel 4. At the same time, the edges 10a of wings 3 tend to dig into the channel edges 11 to aid in preventing movement of the retainer 2. The opening 6 in nut 1 and the oval opening 8 give sufficient slack to be able to insert a screw or bolt through retainer 2 to engage the nut 1.

In this way, the retainer 2 is adjusted in position along channel 4. The nut 1 is free to float to some extent between the wings 3. A screw may fix a lighting fixture to the channel 4 by inserting the screw through the lighting fixture (so that its head presses against the fixture) and through the oval opening in the retainer and then threading the screw into the nut 1. The end of the screw may extend into a space 15 formed between an innermost portion of the channel and the nut 1.

Figure 5A:
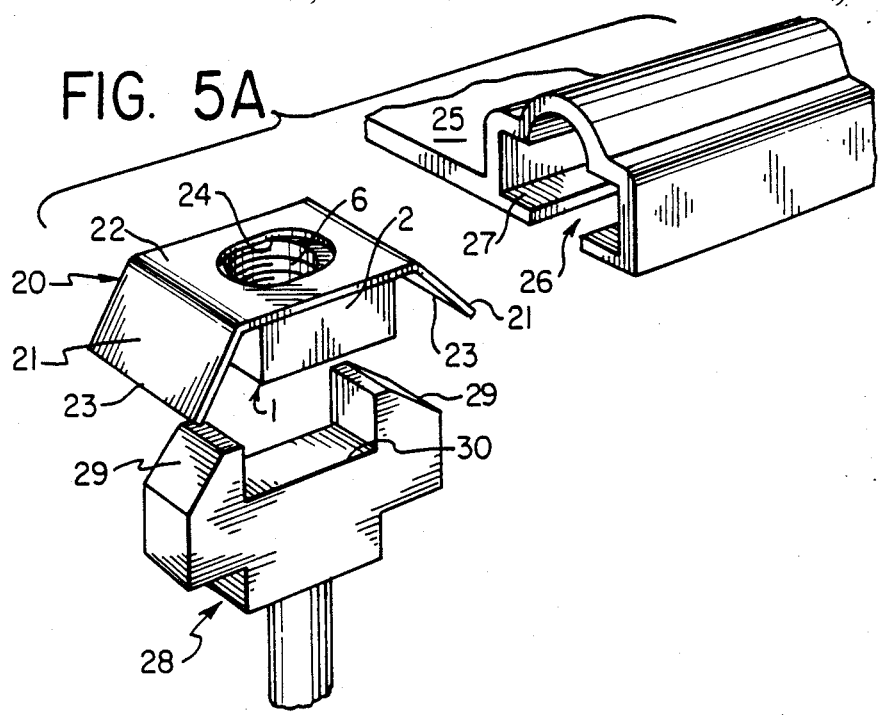
FIG. 5A is a perspective view of a second embodiment of the fastening element and FIG. 5B of a releasing tool of the present invention, in a disassembled condition.

FIG. 5A shows another embodiment of the fastener assembly for a conventional nut 1 with a threaded opening 6. A retainer 20 has a central portion 22 arranged on top of a first face (shown as a top face) of the nut 1. The retainer has two resilient wings 21 extending in opposite directions from the central portion 22, preferably at about an of 135° angle or less in the relaxed position. Each of the wings 21 has an outer edge 23 which is sharp. The wings 21 are resiliently bendable to spread apart. The height of the retainer from edges 23 perpendicular to the central portion 22 is selected to be greater than the height of channel 25. Together, the nut 1 and retainer 20 form a slidable element or assembly.

FIG. 5B shows a tool 28 which may be used to spread the wings 21 further apart by pressing the inclined projections 29 of the tool 28 against the undersides of the wings 21. A recessed area 30 is formed to accommodate the nut 1 therein. The wings 21 are of resilient material so that after the tool is taken away from the wings 21, the wings 21 resiliently bend back from their spread apart position to return to their normal position (e.g. disposed at approximately 135° from the central portion 22) as depicted in FIG. 5A. The wings 21 preferably form a steeper angle than that of the inclined projections 29 of the tool 28.

The slidable element is adapted to be slidably inserted into a grooved channel 26 (which may be part of an extrusion element 25) to a desired position, using the tool 28 to further spread apart the wings 21 to facilitate positioning. Once a desired location is reached, the tool 28 is withdrawn and the wings 21 resiliently bend back towards their normal position so that the outer sharp edges 23 of the wings 21 grip into the inner facing surface 27 of the channel 25. Thus, the tool 28, in being urged upwardly, frees the slidable assembly and permits easy positioning of the assembly by manipulating the tool. Thereafter, in one easy movement (i.e. by withdrawal of the tool 28), the fastening element is retained in its desired location.

The height of the retainer in a normal relaxed position may be slightly larger than the height of the grooved channel 26 so that the retainer is tensioned between inner surfaces of the grooved channel after being released from the tool 28.

The retainer 20 has an opening 24 which is in register with and slightly larger than the threaded opening 6. The central portion 22 of the retainer is preferably longer than the nut 1, which is free to float between the wings 21. Due to the longer size of the opening 24 in the retainer, communication is assured between the openings 6 and 24 despite minor deviation of the retainer from its desired position.

Figure 6:
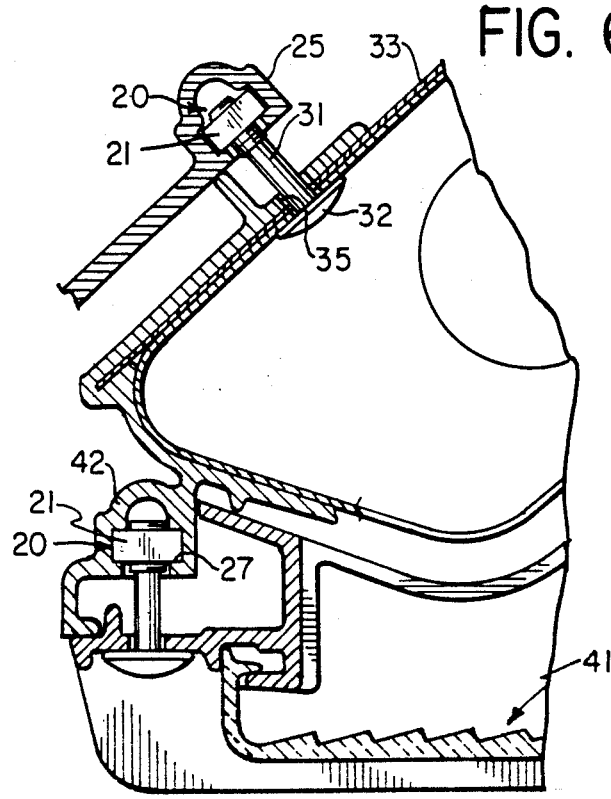
FIG. 6 is a transverse elevational view of the embodiment of FIG. 5A in an assembled condition and holding a lighting fixture.

FIG. 6 illustrates uses of the fastener assemblies of the invention. A lighting fixture shown partially at 33 may be fastened to a fixed extrusion channel 25. The fastener assembly is first positioned in the channel as described above, at a position about opposite a hole 35 of the fixture. A bolt 31 is then inserted through hole 35 to engage the threaded opening 6 of the nut. The opening 8 or 24 of the retainer and the slack between the nut and retainer permit ready alignment of the nut and retainer in relation to the bolt 31. On tightening the bolt 31 in the nut, the head 32 of the bolt clamps the lighting fixture into position against the fixed extrusion channel 25.

A similar fastener assembly may be used to hold a fixture cover and lens 41 to a channel 42 forming part of the fixture.

While the foregoing description and drawings represent the preferred embodiments of the present invention, it will be understood that various changes and modifications may be made without departing from the spirit and scope of the present invention.

I claim:

1. A retainer for adjustably holding in a channel a fastener element having an aperture, the retainer comprising a central section and a pair of wings, said central section having an opening for alignment with the aperture of the fastener element, said wings extending outward at an oblique angle from said central section so as to define with said central section a spacing between said wings for accommodating the fastener element therein, said wings being bendable between a non-engaging position and an engaging position, said wings having engaging portions for engaging a surface of the channel as said wings bend into said engaging position, each of said wings having outwardly facing cutouts for accommodating inwardly directed flanges of the channel.

2. The retainer as defined in claim 1, wherein said engaging portions form part of said outwardly facing cutouts.

3. The retainer as defined in claim 1, wherein said wings have outer edges forming said engaging portions.

4. A retainer for adjustably holding in a channel a fastener element having an aperture, the retainer comprising a central section and a pair of wings, said central section having an opening for alignment with the aperture of the fastener element, said wings extending outward at an oblique angle from said central section so as to define with said central section a spacing between said wings for accommodating the fastener element therein, said wings being bendable between a non-engaging position and an engaging position, said wings having engaging portions for engaging a surface of the channel as said wings bend into said engaging position, said engaging portions being sharp edges for gripping into the surface of the channel.

5. The retainer as defined in claim 1, wherein each of said wings forms an angle of about 135° with said central section in one of said positions.

6. The retainer as defined in claim 1, wherein said wings are formed to resiliently bend into said engaging position.

7. A retainer as in claim 6 having a height in a relaxed position greater than the height of the groove of said grooved channel.

8. A fastening assembly, comprising:
a slidable element having a fastener member and a retainer member, said retainer member having a central section and a pair of wings, said wings extending outward from said central section at an oblique angle relative to said central section so as to define a spacing between said wings, said fastener member being arranged in said spacing, said fastener member having an aperture and said central section having an opening in alignment with said aperture, said slidable element being slidably insertable into an elongated channel, said wings having engaging portions for engaging a surface of said channel, said wings being bendable from a non-engaging position in which said engaging portions are out of engagement with said channel to an engaging position in which said engaging portions releasably engage said channel, said fastener member being arranged in said spacing so that its aperture is accessible from outside said channel, said fastener member being formed to float between said wings, said aperture of said retainer member being wider than said opening of said fastener member so that both of said openings may remain in communication with each other no matter where said fastener member floats between said wings.

9. The assembly as defined in claim 8, wherein said fastener member is formed as a nut.

10. A fastening assembly, comprising:
a slidable element having a fastener member and a retainer member, said retainer member having a central section and a pair of wings, said wings extending outward from said central section at an oblique angle relative to said central section so as to define a spacing between said wings, said fastener member being arranged in said spacing, said fastener member having an aperture and said central section having an opening in alignment with said aperture, said slidable element being slidably insertable into an elongated channel, said wings having engaging portions for engaging a surface of said channel, said wings being bendable from a non-engaging position in which said engaging portions are out of engagement with said channel to an engaging position in which said engaging portions releasably engage said channel, said fastener member being arranged in said spacing so that its aperture is accessible from outside said channel, in combination with:
means for releasing said engaging portions from said surface of said channel so that said slidable element may be freely slidable in said channel, said releasing means including a tool having projections adapted to press against said wings so as to bend said wings into said non-engaging position with said engaging portions out of contact with said surface of said channel, said tool having a depressed area between said projections adapted to accommodate said fastener member.

11. The assembly as defined in claim 10, wherein the tool projections include inclined surfaces adapted to press against the wings.

12. A fastening assembly, comprising:
a slidable element having a fastener member and a retainer member, said retainer member having a central section and a pair of wings, said wings extending outward from said central section at an oblique angle relative to said central section so as to define a spacing between said wings, said fastener member being arranged in said spacing, said fastener member having an aperture and said central section having an opening in alignment with said aperture, said slidable element being slidably insertable into an elongated channel, said wings having engaging portions for engaging a surface of said channel, said wings being bendable from a non-engaging position in which said engaging portions are out of engagement with said channel to an engaging position in which said engaging portions releasably engage said channel, said fastener member being arranged in said spacing so that its aperture is accessible from outside said channel, said engaging portions being sharp edges for gripping into said surface of said channel.

13. The assembly as defined in claim 8, further comprising:
a screw extending through said aperture of said retainer member and said opening of said fastener member, said fastener member holding said screw in position at said aperture.

14. A method for fastening a fastener member in a channel, comprising the steps of:
slidably inserting a slidable element into said channel, said slidable element including said fastener member and a retainer member having a pair of resiliently bendable wings and a flat central section, and
causing said pair of wings to bend relative to said central section of the retainer member from a non-engaging position into an engaging position with respect to said channel by engaging a surface of the channel with engaging portions of the wings as said wings bend into said engaging position,
floating the fastener member between the wings, and
maintaining registry between an aperture of the fastener member and an opening in the central section of the retainer member no matter where the fastener member floats between the wings.

15. The method as defined in claim 14, wherein the slidably inserting includes bending said wings into said non-engaging position.

16. The method as defined in claim 14, further comprising:
aligning an aperture of the fastener member with an opening in the central section of the retainer member, and
engaging a screw in the aperture and through the opening.

17. The method as defined in claim 14, further comprising:
releasing the retainer member in the grooved channel by spreading apart the wings so that the engaging portions of the wings move out of contact with the surface of the grooved channel and into the non-engaging position, to permit movement of said slidable element along said channel.

18. A method for fastening a fastener member in a channel, comprising the steps of:
slidably inserting a slidable element into said channel, said slidable element including said fastener member and a retainer member having a pair of resiliently bendable wings and a flat central section,
causing said pair of wings to bend relative to said central section of the retainer member from a non-engaging position into an engaging position with respect to said channel by engaging a surface of the channel with engaging portions of the wings as said wings bend into said engaging position, releasing the retainer member in the channel by spreading apart the wings so that the engaging portions of the wings move out of contact with the surface of the channel and into the non-engaging position to thereby permit movement of said slidable element along said channel, the releasing including pressing the wings with inclined surfaces formed on projections on a tool.

19. The method as defined in claim 14, further comprising:
mounting a lighting fixture on the grooved channel by a screw engaging said fastener member.

20. The method as defined in claim 14, wherein the bending includes resiliently bending the wings into the engaging position.

21. A method for fastening a fastener member in a channel, comprising the steps of:
slidably inserting a slidable element into said channel, said slidable element including said fastener member and a retainer member having a pair of resiliently bendable wings and a flat central section,
causing said pair of wings to bend relative to said central section of the retainer member from a non-engaging position into an engaging position with respect to said channel by engaging a surface of the channel with engaging portions of the wings as said wings bend into said engaging position, said engaging including gripping into the surface of the channel with sharp edges of the engaging portions.

22. A fastening assembly, comprising:
a slidable element having a fastener member and a retainer member, said retainer member having a central section and a pair of wings, said wings extending outward from said central section at an oblique angle relative to said central section so as to define a spacing between said wings, said fastener member being arranged in said spacing, said fastener member having an aperture and said central section having an opening in alignment with said aperture, said slidable element being slidably insertable into an elongated channel, said wings having engaging portions for engaging a surface of said channel, said wings being bendable from a non-engaging position in which said engaging portions are out of engagement with said channel to an engaging position in which said engaging portions releasably engage said channel, said fastener member being arranged in said spacing so that is aperture is accessible from outside said channel, said channel enclosing a space in which is arranged said fastener member and said wings, said channel having flanges extending toward each other, said flanges having an outside surface which faces outward away from said space, said central section of said retainer member having areas against said outside surface of said flanges.

* * * * *